INVENTOR.
RICHARD V. BAUM
BY
*Alf Oldham*
ATTORNEY

July 22, 1958   R. V. BAUM   2,844,311
ELECTRICAL SIMULATOR FOR MECHANICAL LOST-MOTION AND THE LIKE
Filed April 3, 1953   2 Sheets-Sheet 2

FROM t≡A TO t≡B

FROM t≡B TO t≡C

FROM t≡C TO t≡D

FROM t≡D TO t≡E

FROM t≡E TO t≡F

FROM t≡F TO t≡G

INVENTOR.
RICHARD V. BAUM
BY
*H. Oldham*
ATTORNEY

United States Patent Office 2,844,311
Patented July 22, 1958

2,844,311

ELECTRICAL SIMULATOR FOR MECHANICAL LOST-MOTION AND THE LIKE

Richard V. Baum, Phoenix, Ariz., assignor to Goodyear Aircraft Corporation, Akron, Ohio, a corporation of Delaware Application April 3, 1953, Serial No. 346,747

14 Claims. (Cl. 235—61)

This invention relates to electronic means, useful in an electronic analog computer or an electronic differential analyzer, for electrically simulating lost-motion, hysteresis, dead-space and the like in mechanical, hydraulic, magnetic and other systems, within such systems.

It is the general object of this invention to simulate electrically, by means of relatively simple, inexpensive, durable and readily adjusted electrical means, the backlash or lost-motion existent in a mechanical system incorporating moving parts such as gears, cables, levers, cams and the like.

Another object of this invention is to simulate electrically the hysteresis existent in a system incorporating components of magnetic, electrostatic, and like nature.

Still another object of this invention is to simulate electrically the slack or play in a system incorporating components of a hydraulic nature.

These and other objects of the invention, which will become apparent as the description proceeds, are achieved broadly by the provision of electrical means, usually of adjustable type, for automatically varying an electric waveform simulating or representative of the motion of a mechanical or like system. The electrical means serve to change the waveform in accord with the actual changes existing in the system due to lost-motion, hysteresis, or the like. More specifically in a preferred circuit, the electrical means may include a summing amplifier connected in such manner that the input consists of the electric waveform characteristic of or simulating the mechanical system plus a feed-back from the output potential; the two respective inputs are summed-up at the output of said amplifier and are so connected, through a voltage-divider network and two diodes, that conduction only occurs when the summed input potential to the voltage-divider network is greater than some constant (K) which is determined by the setting of the voltage-divider network; the output from the diodes being connected through a sign-changing amplifier to the input of an integrating amplifier possessing a very rapid speed of response in comparison with the speed of the original input potential to the aforesaid summing amplifier; whereby the output from the said intergrating amplifier exhibits, as an electric waveform, the characteristics of the mechanical or other system including the lost-motion, mechanical backlash, or the like of the system. Capacitor means can be included in the circuit to simulate inertia.

For a better understanding of the invention, reference should be had to the accompanying drawings, wherein.

Figure 2:
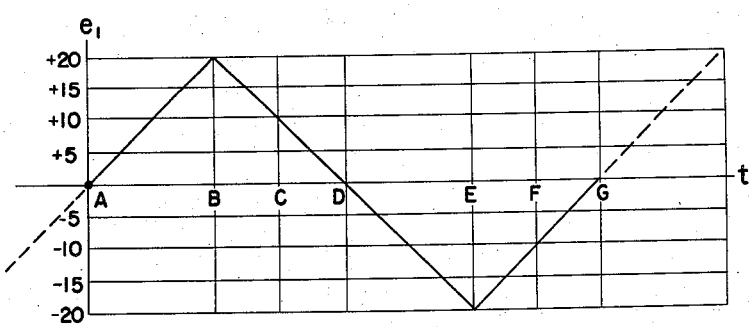
Fig. 2 is a graphical representation of a type of input potential.
Figure 10:
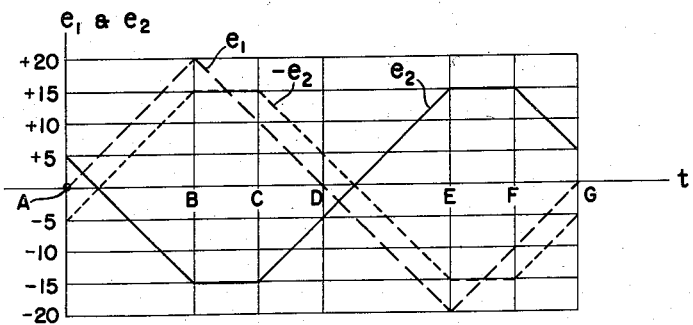
Figure 7:
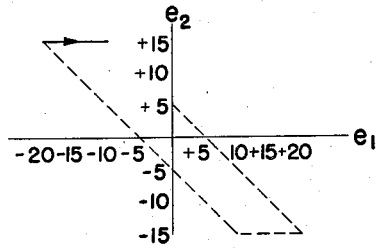
Figure 8:
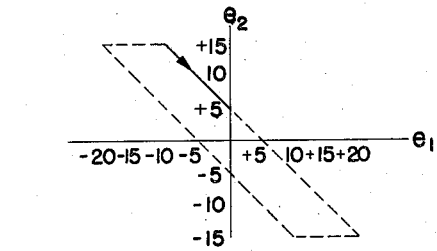
Figure 9:
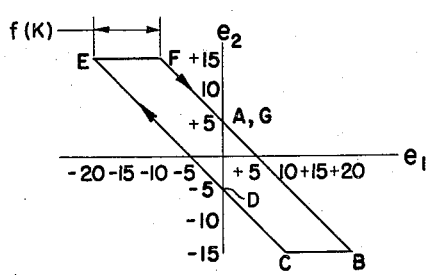
Figure 11:
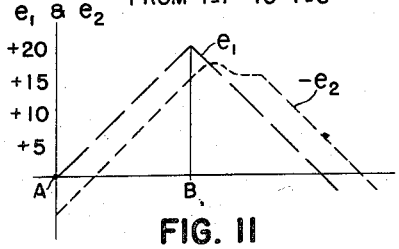

Figs. 3 to 8 inclusive are graphical representations of the relationships existing between the input potential of Fig. 2 and the resultant output potential;

Fig. 9 is a graphical representation of the overall relationships as a result of combining Figs. 3 to 8 inclusive;

Fig. 10 is a view similar to Fig. 2 with the waveform of Fig. 2 being shown in dashed lines and the modified waveform produced by the apparatus of the invention being shown in solid lines; the dotted line showing the negative value of $e_2$ for purposes of comparison; and Fig. 11 is a view similar to a portion of Fig. 10 and illustrating the waveform $e_2$ as further modified by the inclusion in the circuit of an inertia simulating capacitor.

Figure 1:
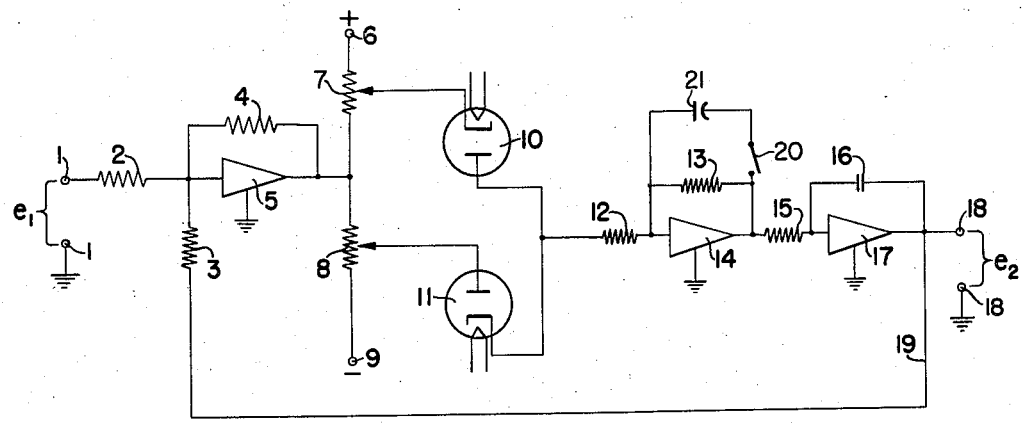
Fig. 1 is a sechematic diagram of a preferred circuit embodiment of the invention.

With specific reference to the form of the invention illustrated in the accompanying drawings, in Fig. 1, an input potential $e_1$ is introduced at terminal 1. It will be understood that the input potential $e_1$ is an electric simulation of the mechanical or like system being simulated, as hereinafter discussed in greater detail in conjunction with Fig. 2. The terminal 1 is connected through a resistor 2 into the input of a direct-coupled negative-feedback summing amplifier 5. The output potential $e_2$, which will hereinafter be discussed in greater detail, is of opposite sign with respect to the input potential $e_1$, and is fed back through connection 19 and resistor 3 to the input of the amplifier 5. The amplifier 5, with a feedback resistor 4, acts in such manner that the input to the voltage divider network consisting of variable resistances 7 and 8 is the negative of the summation of potentials $e_1$ and $e_2$. At the opposite terminals 6 and 9 of the voltage-divider network, a positive and negative potential, respectively, is connected from an external power source.

Diodes 10 and 11 are connected to the variable resistances 7 and 8, respectively, in such manner than when the input potential to the junction of the variable resistors 7, and 8 is greater in magnitude than K (normally an adjustable constant) and positive in sign, diode 11 will be conducting and diode 10 will be non-conducting; likewise, when the said input potential is greater in magnitude than K and negative in sign, diode 10 will be conducting and diode 11 will be non-conducting. When the said input potential is less in magnitude than K and of either positive or negative sign, neither diode 10 nor 11 will be conducting. The value of K can be varied by means of the variable resistances 7 and 8. The output potential from the diodes 10 and 11 is connected to a direct-coupled negative-feedback sign-changing amplifier 14 through a resistor 12. The function of the amplifier 14, with a feedback resistor 13, is to provide an output voltage equal in magnitude to the input voltage but of the opposite sign.

By closing a switch 20 and placing a suitable capacitor 21 across resistor 13, some of the effects of a system having an inertial load may be taken into account. Without the capacitor 21 the circuit simulates a system having sufficiently low inertia so that sliding friction is the predominant element.

The output of the amplifier 14 is connected to a suitable direct-coupled negative-feedback integrating amplifier 17 through a resistor 15. The amplifier 17, with a feedback condenser 16, is an integrating amplifier designed in such manner as to have a very rapid speed of response as compared to the rate of change of the original input potential $e_1$. The output voltage of amplifier 17 is proportional to the negative of the time integral of the output voltage of amplifier 14.

Figure 3:
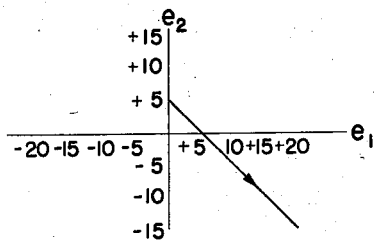
Figure 4:
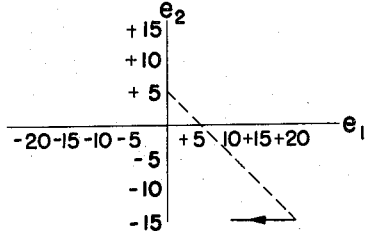
Figure 5:
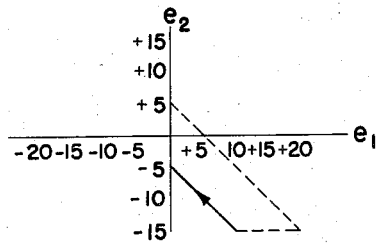
Figure 6:
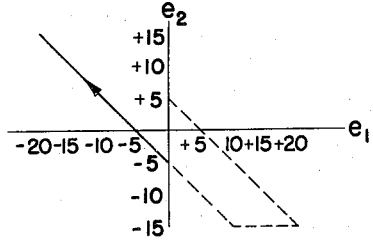

The action of the electric simulator can best be understood when described for a specific example as shown in Figures 2 through 8 inclusive. The absolute values shown in these figures are assumed only for ease of description and therefore are not designated hereafter dimensionally in physical units. It is assumed for purposes of illustration that the input potential $(e_1)$ varies with time $(t)$ as shown in the waveform diagram in Figure 2, and that this input waveform has been applied long enough for the apparatus to reach a steady state of operation. This waveform represents an electrical simulation of a mechanical or like system driven in reverse directions at the times graphically shown and at speeds represented or simulated by the voltages graphically illustrated. Now the variable resistances 7 and 8 of Figure 1 are set in such manner that K (a constant) is of a magnitude such that neither tube 10 nor 11 will conduct in the region where $e_1$ is between +20 and +10 and between —20 and —10 as located on the time scale of Figure 2 between points B and C, and between points E and F, respectively. I. e., K is set so that conduction occurs only when the input to the voltage-divider network is at least slightly greater in magnitude than 5 volts. The steady-state response of the output $e_2$ to the change in the input $e_1$, between the points A to B on the time axis of Figure 2, is shown in Figure 3, wherein as the input potential $e_1$ varies from 0 to +20, the output potential $e_2$ varies correspondingly from +5 to —15, respectively. During this period of time represented by the distance between A and B of Figure 2, tube 10 is conducting, as the sign of the potential at the input to the voltage-divider network is negative and of sufficient potential level (5) to cause tube 10 to conduct. Between points B and C of Figure 2, the response of $e_2$ to the change in $e_1$ is shown in Figure 4. Starting at point B the tube 10 no longer conducts as there is insufficient potential level (below 5) existent at the input to the voltage-divider network and thus as $e_1$ varies from +20 to +10 (from B to C in Figure 2) there is no corresponding change in $e_2$; $e_2$ remaining at a potential of —15. Between points C and D of Figure 2, the response of $e_2$ to the change in $e_1$ is shown in Figure 5. Starting at point C, $e_1$ varies from +10 to 0, and $e_2$ varies correspondingly from —15 to —5, respectively. At the point C of Figure 2, tube 11 begins conducting as the sign of the potential at the input to the voltage-divider network is positive and of sufficient potential level (5) to cause tube 11 to conduct. Between points D and E of Figure 2, the response of $e_2$ to the change in $e_1$ is shown in Figure 6. Starting at point D, $e_1$ varies from 0 to —20, and $e_2$ varies correspondingly from —5 to +15, respectively. In this time interval from D to E of Figure 2, tube 11 remains in a conducting condition. Between points E and F of Figure 2, the response of $e_2$ to the change in $e_1$ is shown in Figure 7. Starting at point E, tube 11 no longer conducts as there is insufficient potential level (below 5) existent at the input to the voltage divider network and thus as $e_1$ varies from —20 to —10 there is no corresponding change in $e_2$; $e_2$ remaining at a potential of +15. Between points F and G of Figure 2, the response of $e_2$ to the change in $e_1$ is shown in Figure 8. Starting at point F, $e_1$ varies from —10 to 0, and $e_2$ varies correspondingly from +15 to +5, respectively. At the point F of Figure 2, tube 10 begins conducting as the sign of the potential at the input to the voltage-divider network is now negative and of sufficient potential level (5) to cause tube 10 to conduct.

The relationships between $e_1$ and $e_2$ graphically depicted in piecemeal in Figures 3 to 8 inclusive, can now be shown by means of a combined relationship path as in Figure 9. The relationship of $e_1$ to $e_2$ as shown in Figure 9 exhibits the characteristic of mechanical lost-motion or backlash, with $f(K)$ representing some mathematical function of K, and determining the magnitude of the lost-motion or backlash.

In Figure 10, a relative comparison is shown of the original waveform input at $e_1$ (dashed line), and the output waveform at $e_2$ (solid line). The dead-space characteristic can be more easily noted in comparing the negative of the output, —$e_2$ (dotted line), with the input waveform $e_1$. The sign of the output is not as important as the magnitude of the potential, as, dependent on desired ultimate usage, the sign of the output can be reversed simply by adding a sign-changing means at the output.

The operation of the circuit has been described without including the operation of the capacitor 21, which allows $e_2$ to overshoot at the top and bottom of each cycle and to thus simulate the effect of inertia. Fig. 11 illustrates the inertia-simulating modification of the output waveform —$e_2$ because of the presence of the capacitor 21.

It will be recognized that apparatus of the invention can be utilized to electrically simulate a wide variety of mechanical, hydraulic and other systems having inherent lost-motion and like characteristics, and with these characteristics being incorporated, usually adjustably, into the electric simulation of the system.

While certain representative embodiments and details have been shown for the purpose of illustrating the invention, it will be apparent to those skilled in this art that various changes and modifications may be made therein without departing from the spirit or scope of the invention. For example: triodes and other type tubes could be utilized to replace the diodes by making the surplus grids and other elements inoperative and otherwise effectively retaining the cathode-plate combination; the waveform input could be directly connected to the input of the voltage-divider network eliminating the summing amplifier and the sign-changing amplifier, all at the sacrifice of some efficiency and accuracy; the variable resistance voltage-divider network could be replaced with fixed resistances thusly limiting the application and operating range of the device; the variable resistances of the voltage-divider network could be controlled in such fashion that the constant K could be made a function of another variable; and similar modifications.

I claim:

1. Electrical means for simulating a system having dead-space and the like, comprising a direct-coupled negative-feedback summing amplifier adapted to receive a waveform input electrically simulating a system, a variable-resistor voltage-divider network having a direct-current potential imposed thereon and coupled to the output of said summing amplifier, a pair of diodes coupled to said voltage-divider network to selectively conduct negative and positive voltages when in excess of or equal to amounts determined by the setting of the voltage-divider network, said coupling being the cathode of the first diode connected to the movable element of one variable-resistor in said voltage-divider network, said variable resistor having the positive direct-current potential imposed on one side thereof, the plate of the second diode being connected to the movable element of the other variable-resistor in said voltage-divider network, said variable-resistor having a negative direct-current potential imposed thereon, the plate of the first diode and the cathode of the second diode being connected, a direct-coupled negative-feedback sign-changing amplifier coupled to the output of said diodes, a condenser, switching means for connecting the condenser across the sign-changing amplifier, a direct-coupled negative-feedback integrating amplifier coupled to the output of said sign-changing amplifier, a feedback connection from the output of said integrating amplifier to the input of the summing amplifier, and output terminals connected to the output of the integrating amplifier.

2. Electrical means for simulating a system having dead-space and the like, including electrical sign-changing summing means adapted to receive an electric input simulating a system, voltage-divider circuit means having a direct-current potential imposed thereon and coupled to the output of said summing means, a pair of diodes coupled to the voltage-divider circuit means to selectively conduct negative and positive voltages when in excess of or equal to amounts determined by the voltage-divider circuit means, said coupling being the cathode of the first diode connected to the movable element of one variable-resistance means in said voltage-divider circuit means, said variable-resistance means having the positive direct-current potential imposed on one side thereon, the plate of the second diode being connected to the movable element of the other variable-resistance means in said voltage-divider circuit means, said variable-resistance means having a negative direct-current potential imposed thereon, the plate of the first diode and the cathode of the second diode being connected, sign-changing circuit means coupled to the output of said diodes, a condenser, switching means for connecting the condenser across the sign-changing circuit means, integrating circuit means connected to the output of said sign-changing circuit means, a feedback connection from the output of the integrating means to the summing means, and output terminals connected to the output of the integrating means.

3. Electrical means for simulating a system having dead-space and the like, comprising a direct-coupled negative-feedback summing amplifier adapted to receive a waveform input electrically simulating a system, a variable-resistor voltage-divider network having a direct-current potential imposed thereon and coupled to the output of said summing amplifier, a pair of diodes coupled to said voltage-divider network to selectively conduct negative and positive voltages in excess of or equal to amounts determined by the voltage-divider network, a direct-coupled negative-feedback sign-changing amplifier coupled to the output of said diodes, a direct-coupled negative-feedback integrating amplifier coupled to the output of said sign-changing amplifier, a feedback connection from the output of the integrating amplifier to the input of the summing amplifier, and output terminals connected to the output of the integrating amplifier.

4. Electrical means for simulating a system having dead-space and the like, comprising sign-changing summing circuit means adapted to receive a waveform input electrically simulating a system, voltage-divider circuit means having a direct-current potential imposed thereon and coupled to the output of said summing circuit means, electrical circuit means acting selectively as to sign and potential of its input and coupled to the output of said voltage-divider circuit means, sign-changing circuit means coupled to the output of said electrical circuit means, sign-changing integrating circuit means coupled to the output of said sign-changing means, a feedback connection from the output of said integrating circuit means to the input of the summing means, and output terminals connected to the output of said integrating means.

5. Electrical means for simulating a system having dead-space and the like, comprising a voltage-divider network adapted to receive a waveform input electrically the sign-reversed simulation of a system, a direct-current potential being imposed on said voltage-divider network, a pair of diodes coupled to said voltage-divider network to selectively conduct negative and positive voltages in excess of or equal to amounts determined by the voltage-divider network, a direct-coupled negative-feedback sign-changing amplifier coupled to the output of said diodes, a direct-coupled negative-feedback integrating amplifier coupled to the output of said sign-changing amplifier, a sign-changing direct-coupled negative-feedback amplifier for supplying a waveform which is a sign-reversed simulation of a system to said voltage-divider network a feedback connection from the output of the integrating amplifier to the input of said summing amplifier, and output terminals connected to the output of the integrating amplifier.

6. Electrical means for simulating a system having dead-space and the like, comprising a voltage-divider circuit means adapted to receive a waveform input electrically simulating a system, a direct-current potential being imposed on said voltage-divider circuit means, electrical circuit means coupled to the output of said voltage-divider circuit means and selectively conducting negative and positive voltages in excess of or equal to amounts determined by the voltage-divider means, sign-changing circuit means coupled to the output of said electrical means, sign-changing intergrating circuit means coupled to the output of said sign-changing means, a sign-changing direct-coupled negative-feedback amplifier for supplying a waveform which is a sign-reversed simulation of a system to said voltage-divider network, a feedback connection from the output of the integrating means to the input of the summing amplifier, and output terminals connected to the output of the integrating means.

7. Electrical means for simulating a system having dead-space and the like, comprising a direct-coupled negative-feedback sign-changing summing amplifier adapted to receive a waveform input electrically simulating a system, a voltage-divider network having a direct-current potential imposed thereon and coupled to the output of said summing amplifier, a pair of diodes coupled to said voltage-divider network to selectiveely conduct negative and positive voltages in excess of or equal to amounts determined by the voltage-divider network, a direct-coupled negative-feedback sign-changing amplifier coupled to the output of said diodes, a direct-coupled negative-feedback integrating amplifier coupled to the output of said sign-changing amplifier, a feedback connection from the output of the integrating amplifier to the input of the summing amplifier, and output terminals connected to the output of the integrating amplifier.

8. Electrical means for simulating a system having dead-space and the like, comprising sign-changing summing circuit means adapted to receive a waveform input electrically simulating a system, voltage-divider circuit means having a direct-current potential imposed thereon and coupled to the output of said summing circuit means, electrical circuit means coupled to the output of said voltage-divider circuit means and selectively conducting negative and positive voltages in excess of or equal to amounts determined by the voltage-divider means, a sign-changing negative-feedback direct-coupled amplifier coupled to the output of said electrical circuit means, sign-changing integrating circuit means coupled to the output of said sign-changing negative-feedback direct-coupled amplifier, a feedback connection from the output of the integrating means to the input of the summing means, and output terminals connected to the output of the integrating means.

9. Electrical means for simulating a system having dead-space and the like, comprising a direct-coupled negative-feedback summing amplifier adapted to receive a waveform input electrically simulating a system, a voltage-divider network having a direct-current potential imposed thereon and coupled to the output of said summing amplifier, electrical circuit means coupled to the output of said voltage-divider network and selectively conducting negative and positive voltages in excess of or equal to amounts determined by the voltage-divider network, a direct-coupled negative-feedback sign-changing amplifier coupled to the output of said electrical circuit means, a direct-coupled negative-feedback integrating amplifier coupled to the output of said sign-changing amplifier, a feedback connection from the output of the integrating amplifier to the input of the summing amplifier, and output terminals connected to the output of the integrating amplifier.

10. Electrical means for simulating a system having dead-space and the like, comprising a voltage-divider network adapted to receive a waveform input electrically simulating a system, a direct-current potential being imposed on said voltage-divider network, electrical circuit means coupled to the output of said voltage-divider network and selectively conducting negative and positive voltages in excess of or equal to amounts determined by the voltage-divider network, a direct-coupled negative-feedback sign-changing amplifier coupled to the output of said electrical circuit means, a direct-coupled negative-feedback integrating amplifier coupled to the output of said sign-changing amplifier, a sign-changing direct-coupled negative-feedback summing amplifier for supplying a waveform which is a sign-reversed simulation of a system to said voltage-divider network, a feedback connection from the output of the integrating amplifier to the input of the sign-changing summing amplifier, and output terminals connected to the output of the integrating amplifier.

11. Electrical means for simulating a system having dead-space and the like, comprising a direct-coupled negative-feedback summing amplifier adapted to receive a waveform input electrically simulating a system, a voltage-divider network having a direct-current potential imposed thereon and coupled to the output of said summing amplifier, electrical circuit means coupled to the output of said voltage-divider network and selectively conducting negative and positive voltages in excess of or equal to amounts determined by the voltage-divider network, a direct-coupled negative-feedback sign-changing amplifier coupled to the output of said electrical circuit means, a direct-coupled negative-feedback integrating amplifier coupled to the output of said sign-changing amplifier, a feedback connection from the output of the integrating amplifier to the input of the summing amplifier, and output terminals connected to the output of the integrating amplifier.

12. Electrical means for simulating a system having dead-space and the like, comprising a direct-coupled negative-feedback summing amplifier adapted to receive a waveform input electrically simulating a system, a voltage-divider network having a direct-current potential imposed thereon and coupled to the output of said summing amplifier, a pair of diodes each having an anode and cathode and coupled to said voltage-divider network so as to act in a comparing and conducting function, a direct-coupled negative-feedback sign-changing amplifier coupled to the output of said diodes, a direct-coupled negative-feedback integrating amplifier coupled to the output of said sign-changing amplifier with the output of said integrating amplifier suitably connected in a feedback arrangement to the input of the aforementioned summing amplifier and also coupled to the output terminals of the circuit.

13. Apparatus for electrically simulating a system having dead-space and the like, including sign-changing electrical summing means adapted to receive an electrical input simulating a system, adjustable means connected to the output of the summing means for selectively conducting positive and negative voltages in excess of or equaling amounts determined by its adjustment, sign-changing means having a capacitor feed-back connected to the output of the adjustable means, sign-changing integrating means connected to the output of the sign-changing means, a feedback connection from the output of the integrating means to the summing means, and output terminals connected to the output of the integrating means, the adjustable means being set to produce at the output connection an electric output simulating the system and including the changes in the system produced by the dead-space and by inertia.

14. Apparatus for electrically simulating a system having dead-space and the like, including sign-changing electrical summing means adapted to receive an electric input simulating the system, adjustable means connected to the output of the summing means for selectively conducting positive and negative voltages in excess of or equaling amounts determined by its adjustment, a direct-coupled negative-feedback sign-changing amplifier coupled to the output of said adjustable means, sign-changing integrating means connected to the output of the adjustable means, a feedback connection from the output of the integrating means to the summing means, and output terminals connected to the output of the integrating means, the adjustable means being set to produce at the output connection an electric output simulating the system and including the changes in the system produced by the dead-space.

References Cited in the file of this patent
UNITED STATES PATENTS 2,634,909     Lehmann     Apr. 14, 1953

OTHER REFERENCES

Analysis of Problems in Dynamics by Electronic Circuits by J. R. Ragazzini et al.; publication: "The Proceedings of the I. R. E."; vol. 35, No. 7, May 1947, pages 444–452.

Compact Analog Computer by S. Frost; publication: "Electronics," July 1948, pages 116–122.

Design of D.-C. Electronic Integrators by G. Korn; publication: "Electronics," May 1948, pages 124–126.

Electronic Analog Computers by Korn and Korn; published by McGraw-Hill, 1952; P. O. S. L. Cat. No. QA76 K6C.2, pages 73–76.

Catalog and Manual on CAP/R High-Speed all-Electronic Analog Computers for Research and Design, published by Geo. A. Philbrick Researches, Inc., 230 Congress Street, Boston, Mass., 1951.

An Electronic Simulator for Nonlinear Servomechanisms (Edwards et al.) Trans. AIEE, vol. 69, part I, 1950, pages 300–307.

Application of the Cal Tech Electric Analog Computer to Non-linear Mechanics and Servomechanisms (McCann et al.) AIEE Technical Paper, 49–165, May 1949.